United States Patent Office 2,970,759
Patented Feb. 7, 1961

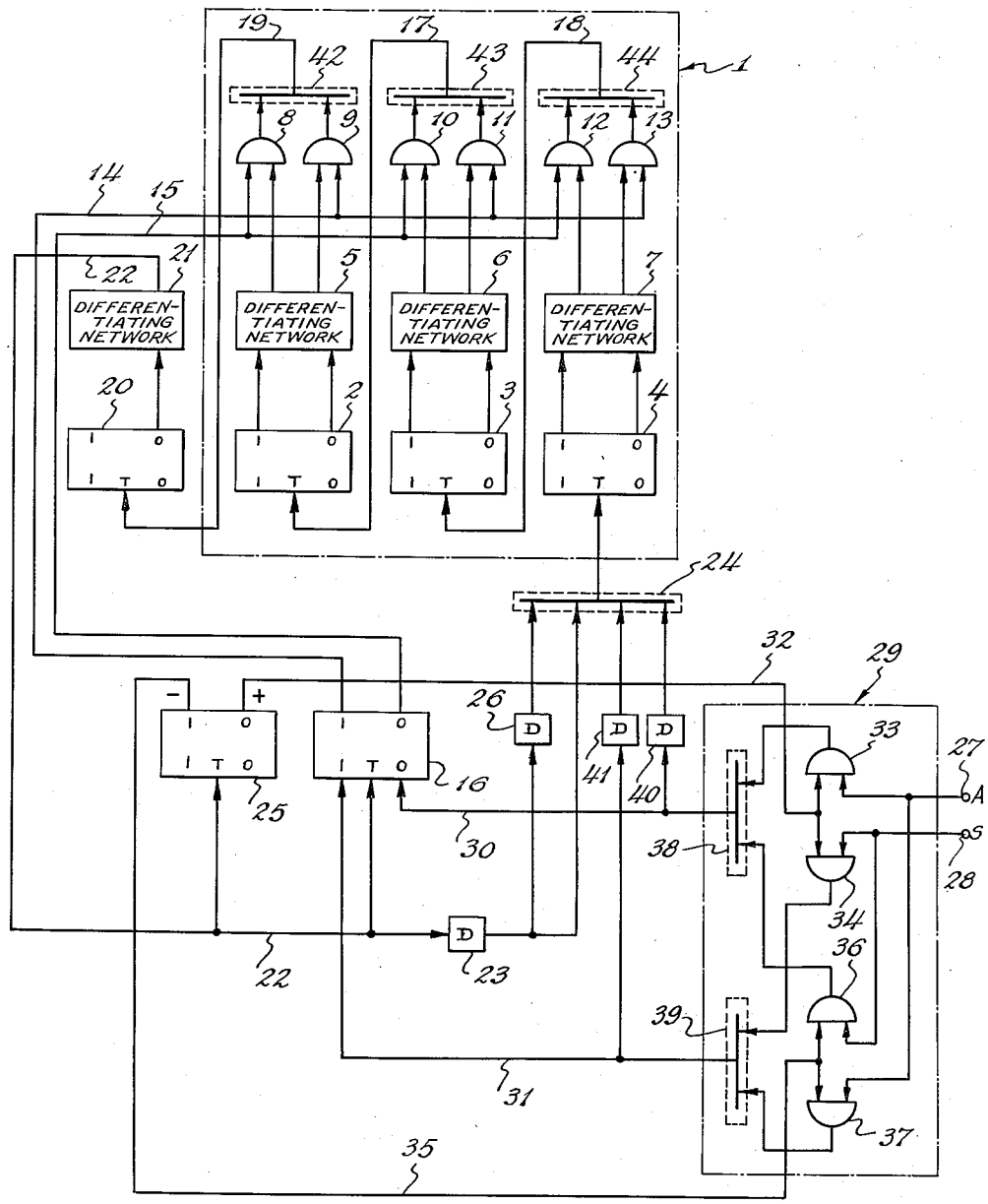

2,970,759

ABSOLUTE VALUE REVERSIBLE COUNTER

Walter C. Lanning, Plainview, N.Y., assignor to Sperry Rand Corporation, a corporation of Delaware Filed May 14, 1957, Ser. No. 659,016

1 Claim. (Cl. 235—92)

The invention relates generally to electrical counters and more particularly to counters adapted to receive input signals of opposite sense and operative to count the aggregate number of said input signals and to continuously store the true algebraic value thereof.

Reversible counters are well known in the digital computer art. One familiar example of such a counter is a cascaded series of flip-flops, each having a trigger input and producing one of two output signals of opposite sense depending on the direction of transition of the state of the flip-flop in response to its corresponding input trigger signal. Thus, each flip-flop is adapted to produce an output signal when its state changes from 0 to 1 and a separate output signal when changing from 1 to 0.

Each flip-flop of the cascaded chain is adapted to receive one of the output signals from its respectively preceding flip-flop as determined by the condition of suitable interstage switching means. Said switching means selectively applies that output signal, from a preceding flip-flop to the trigger input of its correspondingly succeeding flip-flop, as determined by the sense of an applied reversing control signal.

One disadvantage associated with the operation of the above mentioned reversible counter is that when the pulse count, as stored in the respective flip-flop stages of the cascaded chain, goes through zero in a negative direction, the numerical count of the counter becomes the complement of the true input count accumulation. For example, assuming that a three stage reversible binary counter is operating in the aforesaid direction, the count stored in the cascaded chain will proceed in the following sequence in response to applied input pulses of a positive sense: 000, 001, 010, etc. When the sense of the applied input trigger pulses is reversed, the total count stored in the cascaded chain will successively change as follows: 010, 001, 000, 111, 110, etc. The aforementioned complementing effect readily can be seen when the number stored in the cascaded flip-flop chain goes through zero, i.e., as the count changes from 001 through 000 to 111.

In many digital computer applications, the complementing action does not give rise to objectionable effects. However, other applications exist in which the counts of the reversible counter are to control other devices or, alternatively, the number stored in the reversible counter is to be displayed. In such cases, the complementing effect is undesirable.

Various techniques have been proposed in the art to "uncomplement" the numbers stored in the counter, but such techniques are generally costly in terms of required additional apparatus. In a representative case, a source of auxiliary pulses is provided, independent of the source of pulses to be counted, for causing the reversal in state of each component flip-flop of the counter chain. The auxiliary pulses are applied via switching means to the trigger input of each flip-flop. Provision is also made for activating the switching means at that time when the stored number is to be "uncomplemented." Additionally, means are included for preventing the flow of any interstage transfer pulses that may be produced as a consequence of the application of the auxiliary pulses.

It is the general object of the present invention to overcome the aforementioned shortcoming of prior art devices by the provision of a simplified reversible counter for displaying the absolute value of the stored number at all times.

Another object is to provide a reversible counter for storing independently the absolute value of the count and the sense of said absolute value.

A further object is to provide a reversible counter wherein the stored number progresses in uniform increments through 0 in either direction.

These and other objects of the present invention, as will be apparent from the following specification, are accomplished in a preferred embodiment by the provision of reversible binary counting means and associated circuit components for controlling the direction of the count, for storing the sense of the count, and for comparing said stored sense information with sense information contained in applied input pulses. When the stored sense information is positive, i.e., the number stored in the counter is a positive number, the counter will go forward or backward in direct relationship to the sense of applied input pulses.

On the other hand, when the stored sense information is negative, i.e., the number stored in the counter is a negative number, the counter will go forward or backward in opposite sense to the sense of applied input pulses.

Means are also provided for detecting the transition of the number stored in the reversible counter when it changes from a 0 count to a maximum count. Said sensing means provides an output signal which operates on the counter so as to change the maximum count to a count which is one more than its zero count. Such change in count is accomplished in a time interval less than the time separation between successive applied pulses to be counted.

For a more complete understanding of the present invention, reference should be had to the following specification and to the sole figure which is a logical block diagram of a preferred embodiment.

In the figure, a standard reversible counter is generally represented by the numeral 1. By way of example, counter 1 is shown as being comprised of three cascaded flip-flops 2, 3, and 4. Flip-flop 4 is the unitary or input stage of the counter. The representation of the flip-flops is intended to show that the state of the flip-flops will be reversed upon the application of an input trigger pulse at terminal T. An output pulse is produced at terminal 1 when the flip-flop changes state from 1 to 0; an output pulse is produced at terminal 0 when the flip-flop changes state from 0 to 1.

Differentiating networks 5, 6, and 7 produce positive and negative pulses in a well known manner upon the occurrence of the leading and trailing edges, respectively, of the rectangular output pulses from respectively associated flip-flops 2, 3, and 4. AND gates 8, 9, 10, 11, 12 and 13 each derive one input from a corresponding output of an associated differentiating network. Second inputs to each of the AND gates are obtained via lines 14 and 15, each of which carries a signal representing the state of control flip-flop 16. The outputs of the AND gates are applied in corresponding pairs to the inputs of OR gates 42, 43, and 44.

The interstage transfer signal is applied via lines 17 and 18 from the output of a preceding flip-flop to the input of its immediately succeeding flip-flop. Assuming, for example, that flip-flop 16 is in state 0, line 15 is energized in turn rendering AND gates 8, 10, and 12 conductive upon the occurrence of corresponding output pulses from flip-flops 2, 3, and 4 as they change state from 1 to 0. Thus, carry pulses on lines 17 and 18 cause reversible counter 1 to count in a forward or positive direction.

Similarly, when flip-flop 16 is in state 1, line 14 is energized causing the conduction of AND gates 9, 11, and 13 upon the occurrence of output pulses from corresponding flip-flop stages 2, 3 and 4 as they change state from 0 to 1. In this latter case, a borrow signal is transmitted via coupling lines 17 and 18 so that counter 1 operates in a reverse or subtractive manner. Th operation of reversible counter 1 is well known in the art as may be seen by reference to the discussion beginning on line 9, column 4 of U.S. Patent 2,656,106, issued to Howard P. Stabler on October 20, 1953.

For purposes of the present invention, the number of cascaded flip-flops used in counter 1 is so chosen that the numerical capacity of the resultant counter is never exceeded by the largest absolute value number to be stored therein. As previously mentioned, three stages are shown for illustrative purposes only.

The transfer term signal from the highest order binary stage, represented by flip-flop 2, is applied via line 19 to the trigger input of flip-flop 20. Differentiating network 21 is adapted to receive only the 0 output of flip-flop 20, i.e., that output signal which is produced upon the transition of the state of flip-flop 20 from 0 to 1. The pulse produced at the output of network 21 is applied via line 22 to the trigger inputs of sign flip-flop 25 and control flip-flop 16; it is also applied by pulse delay means 23 directly to a first input to OR gate 24 and via pulse delay means 26 to a second input thereto.

It is assumed that means (not shown are available for resetting flip-flops 25, 16, 20, 2, 3, and 4 to a predetermined initial condition such as state 0.

The present invention is adapted to receive input control pulses at terminals 27 and 28. The pulses applied at terminal 27 are intended to cause the count stored in respective flip-flop stages 2, 3, and 4 of counter 1 to increase algebraically in corresponding steps of unity. Conversely, input pulses applied to terminal 28 are intended to cause the count stored in respective stages of counter 1 to decrease algebraically in steps of unity. Input reversing means 29 is adapted to receive the input pulses that are applied via terminals 27 and 28 and to either directly or inversely apply said input pulses to lines 30 and 31 in accordance with the state of flip-flop 25.

The 0 output terminal of flip-flop 25 is connected via line 32 to first inputs of AND gates 33 and 34. The 1 output terminal of flip-flop 25 is connected via line 35 to first input terminals of AND gates 36 and 37. Second inputs to AND gates 33 and 37 are derived from terminal 27 while second inputs to AND gates 34 and 36 are derived from terminal 28. When flip-flop 25 is in state 0, AND gate 33 and AND gate 34 are rendered conductive, respectively, upon the occurrence of input pulses applied to terminals 27 and 28. Pulses applied to terminals 27 are hereinafter termed "additive" pulses; pulses applied to terminals 28 are hereinafter termed "subtractive" pulses.

The output of AND gate 33 is connected to a first input to OR gate 38, a second input to which is derived to the output of AND gate 36. The output of AND gate 34 is connected to a first input of OR gate 39, a second input to which is obtained from the output of OR gate 37. The output of OR gate 38, appearing on line 30, is applied to the 0 input of flip-flop 16 and by pulse delay 40 to a third input of OR gate 24. The output of OR gate 39, appearing on line 31, is applied to the 1 input of flip-flop 16 and via pulse delay means 41 to a fourth input of OR gate 24.

Assuming that flip-flops 20, 2, 3, 4, 25, and 16 are each originally set to state 0, and assuming further that an additive input pulse is applied via terminal 27, the operation is as follows. AND gate 33 is rendered conductive upon the occurrence of the additive pulse. The pulse appearing at the output of AND gate 33 is applied via OR gate 38 to the 0 reset input of flip-flop 16 (which is already in stage 0). Said output pulse from OR gate 38 is then applied via delay 40 and OR gate 24 to the trigger input terminal of flip-flop 4. Delay 40 is adjusted to introduce sufficient delay to allow for the resetting of flip-flop 16, where necessary, prior to the application of the trigger pulse to flip-flop 4.

Upon the continued succession of additive input pulses, the count stored in counter 1 increases from 0 in unitary increments in a conventional manner. Assuming now that subtractive pulses are applied via terminal 28, AND gate 34 is rendered conductive thus applying pulses via line 31 to the one reset terminal of flip-flop 16, reversing its previous state. The reversal in state of flip-flop 16 causes a reversal in the sense of operation of counter 1. Pulses appearing on line 31 are applied via delay 41 and OR gate 24 to the trigger input of flip-flop 4. Delay 41 is similar in function to the previously discussed delay 40. The count already stored in counter 1 then decreases in steps of one, in response to subsequent subtractive input pulses, until the stored count is reduced to 0.

The operation of the present invention just described is represented by the first nine rows of the following table:

| Row | Input | Counter | FF-25 | FF-16 | Total Count |
|---|---|---|---|---|---|
| 1 | 0 | 0000 | + | A | +0 |
| 2 | +1 | 0001 | + | A | +1 |
| 3 | +1 | 0010 | + | A | +2 |
| 4 | +1 | 0011 | + | A | +3 |
| 5 | +1 | 0100 | + | A | +4 |
| 6 | −1 | 0011 | + | S | +3 |
| 7 | −1 | 0010 | + | S | +2 |
| 8 | −1 | 0001 | + | S | +1 |
| 9 | −1 | 0000 | + | S | +0 |
| 10 | −1 | 1111 | +− | SA | |
|    |    | 0000 | − | A | −1 |
|    |    | 0001 | − | A | |
| 11 | −1 | 0010 | − | A | −2 |
| 12 | −1 | 0011 | − | A | −3 |
| 13 | +1 | 0010 | − | S | −2 |
| 14 | +1 | 0001 | − | S | −1 |
| 15 | +1 | 0000 | − | S | −0 |
| 16 | +1 | 1111 | −+ | SA | |
|    |    | 0000 | + | A | |
|    |    | 0001 | + | A | +1 |
| 17 | +1 | 0010 | + | A | +2 |

In the above table, the first column represents successive pulses as may be applied to input terminals 27 and 28. The plus symbol designates an additive pulse; the minus symbol represents a subtractive pulse. Four digits are shown in the second column, each representing the state of a respective flip-flop 20, 2, 3, and 4. The third column indicates the state of sign flip-flop 25, a plus corresponding to state 0 and a minus corresponding to state 1. The fourth column represents the state of control flip-flop 16, the "A" designating state 0 and the "S" designating 1. The fifth column indicates the total number accumulation in the reversible counter 1 of the sole figure.

The first nine rows of the table illustrate the operation of the apparatus of the present invention when four successive additive pulses are followed by four successive subtractive pulses. In row 10, the fifth subtractive pulse, applied via terminal 28, causes the transition of the count from 0000 to 1111. The corresponding change in state of flip-flop 20 from 0 to 1 produces an output pulse which is applied by line 22 to the trigger input of flip-flops 25 and 16, reversing the state of both. Said output pulse is delayed once (23) and twice (23 and 26) and applied via OR gate 24 to the trigger input of flip-flop 4. Upon the reversal of state of flip-flop 16, the sense of operation of counter 1 is changed from subtractive to additive. The aforementioned once-delayed pulse is thus added to the maximum count 1111 causing it to change to 0000. The twice-delayed pulse increases said count to 0001.

It will be noted from row 11 of the table, that counter 1 is now operating in a forward or additive direction despite the fact that subtractive input pulses continue to be applied to terminal 28. In row 12 of the table, a final subtractive pulse is applied which increases the count to 0011.

It is now assumed that the subtractive pulses are discontinued and are replaced by additive pulses applied to terminal 27. Thus, the state of flip-flop 16 is once again reversed, in turn causing the sense of operation of counter 1 to change from an additive to a subtractive mode. In this way, the count shown in row 12 is reduced from 0011 to 0010. Subsequent additive pulses further reduce the total count to 0000 as indicated in row 15. Upon the occurrence of one additional additive pulse, as shown in row 16, the 0000 count is transformed to 1111. In a fashion similar to that described previously with respect to row 9 of the table, an output pulse is produced on line 22 upon the transition of the count from 0000 to 1111, reversing the state of flip-flops 25 and 16. The once-delayed pulse, when applied by delay 23 to the trigger input of flip-flop 4, changes the count to 0000 while the subsequently following twice-delayed pulse increases the count to 0001.

It can be seen upon a study of the table that the counter always contains the absolute value of the pulse count (as shown in column 5 thereof) irrespective of the number of reversals in the sense of the pulses applied to terminals 27 and 28. It should be noted that the absolute value of the total count is readily available by monitoring the state of flip-flops 2, 3, and 4 representing the respective digits of a corresponding binary number. The appropriate sign prefix to the absolute value is contained in the form of the state of flip-flop 25. Although no specific techniques are disclosed in the figure, many will be immediately apparent to those skilled in the art for reading out the state of flip-flops 2, 3, 4, and 25 for purposes of obtaining the true algebraic value of the total accumulated number stored by the present invention.

It can be seen from the preceding specification that the objects of the present invention have been achieved by the provision of a reversible binary counter and means for storing the sense of the operation of the counter. The apparatus of the present invention is adapted to operate in a sense directly determined by the sense of applied input pulses when the sign of the stored number is positive. Switching means are provided for reversing the sense of operation of the reversible counter, relative to the sense of the information contained in the input pulses, when the sign of the number stored is negative. Monitoring means are also provided for detecting the transition of the stored count from its zero to maximum count. Additional means, responsive to the output of said monitoring means, changes the stored maximum count to a count of one. There is thus provided a reversible counter which always contains the absolute value of the accumulated count. The proper sign prefix to be applied to said absolute value is continuously available by noting the state of the monitoring means.

While the invention has been described in its preferred embodiments, it is to be understood that the words which have been used are words of description rather than of limitation and that changes within the purview of the appended claim may be made without departing from the true scope and spirit of the invention in its broader aspects.

What is claimed is:

Apparatus comprising reversible counting means having a trigger input and first and second control inputs whereby said counting means is operative to count the number of data pulses applied to said trigger input in a sense determined by which of said control inputs is activated, first bistable means having first and second reset terminals and a trigger terminal, second bistable means having a trigger terminal, each said first and second bistable means producing first and second output signals respectively representing opposite states thereof, means for applying said first and second output signals of said first bistable means to respective ones of said first and second control inputs, means connected to said counting means for sensing the change in the value of the count stored in said counting means from a zero value to a maximum value and for producing a third output signal upon the occurrence thereof, means for applying said third output signal to the trigger terminal of each said first and second bistable means, switching means having a pair of output terminals and first and second control terminals, said switching means applying first and second data pulses to selected respective ones of said output terminals in dependence upon which of said control terminals is activated, means for applying said first and second output signals of said second bistable means to respective ones of said first and second control terminals, each of said output terminals of said switching means being connected to a respective one of said first and second reset terminals of said first bistable means, first and second delay means for connecting respective ones of said output terminals of said switching means to said trigger input of said counting means, and third and fourth delay means for separately applying said third signal to the last-named trigger input, said third and fourth delay means delaying said third signal by different amounts.

References Cited in the file of this patent

UNITED STATES PATENTS

| | | |
|---|---|---|
| 2,735,005 | Steele | Feb. 14, 1956 |
| 2,754,059 | Wilcox | July 10, 1956 |
| 2,789,766 | Wood | Apr. 23, 1957 |
| 2,823,856 | Booth et al. | Feb. 18, 1958 |

FOREIGN PATENTS

| | | |
|---|---|---|
| 975,941 | France | Oct. 17, 1950 |